April 6, 1965 H. R. UHTENWOLDT ET AL 3,176,590

CLAMPING DEVICE

Filed Sept. 1, 1961

INVENTORS
HERBERT R. UHTENWOLDT
ALBERT H. DALL

BY
Howard Keiser
John F. Verhoeven
ATTORNEYS

United States Patent Office 3,176,590
Patented Apr. 6, 1965

3,176,590
CLAMPING DEVICE
Herbert R. Uhtenwoldt, Wilmington, and Albert H. Dall, Cincinnati, Ohio, assignors to The Cincinnati Milling Machine Co., Cincinnati, Ohio, a corporation of Ohio
Filed Sept. 1, 1961, Ser. No. 136,408
7 Claims. (Cl. 91—45)

This invention relates to an improved form of clamp for securing a movable member in a fixed position with respect to its support and, more particularly, to a means for clamping such a member in its adjusted position without disturbing the location thereof.

In the past it has been customary to clamp the positionable parts of a machine tool against relative movement by pressure operated devices acting directly between the parts. Thus, in the case of a machine tool slide, for example, the conventional practice has been to clamp the slide with respect to its support by one or more pressure shoes mounted on the support and urged forcibly into contact with the slide. This arrangement is costly, takes up space, and even when carefully designed may cause a slight movement of the slide to take place when the pressure shoes are applied.

To eliminate this difficulty and to provide a simple and reliable form of clamping device, a clamp has been devised which may be incorporated directly within the hydraulic cylinder utilized to actuate the slide. Thereby, a saving of space and hydraulic lines can be effected as will be more fully understood as the description proceeds. Also, the design of the clamp is such as to eliminate any "picking" or "inching" of the slide when the clamp is applied thereby ensuring that the original positioning of the slide will not be disturbed.

Accordingly, it is an object of the present invention to provide a new and improved clamping device for holding a positionable element against movement.

Another object of the invention is to provide a clamp which can be incorporated in a hydraulic cylinder type of actuator.

Another object of the invention is to provide a clamp which will not change the relative positions of the parts when the clamp is applied.

Another object of the invention is to provide a system for clamping a hydraulically actuated slide wherein the clamp will automatically be released whenever pressure fluid is supplied to the actuator to effect repositioning of the slide.

With these and other objects in view, which will become apparent from the following description, the invention includes certain novel features of construction and combinations of parts, the essential elements of which are set forth in the appended claims, and a preferred form or embodiment of which will hereinafter be described with reference to the drawings which accompany and form a part of this specification.

Figure 1:
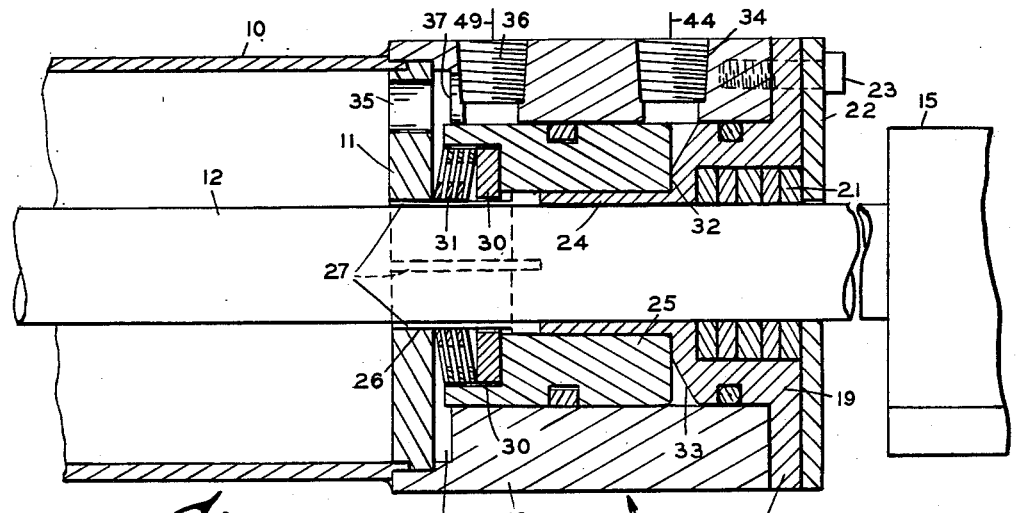
FIG. 1 is a cross-sectional view showing the new form of clamping device as applied to a hydraulic cylinder type of actuator.

The invention is particularly suited for use with positionable elements such as machine tool slides which are operated by a hydraulic cylinder connected between the slide and its support. In this case, the clamp may conveniently be designed as a part of the hydraulic cylinder itself with consequent savings in cost and space. In FIG. 1, for example, there is shown a hydraulic cylinder 10 provided with a cylinder head 11 apertured to receive a piston rod 12 which is fastened at one end to a piston 13 (see FIG. 2) working within the cylinder 10. The piston rod 12 passes through the clamping device, designated generally by reference numeral 14, and is fastened at its other end to a machine tool element such as slide 15.

The clamping device 14 includes a cylinder 18 which, in the present embodiment of the invention, is shown attached directly to the end of the hydraulic cylinder 10, the cylinder head 11 also forming a cylinder head for one end of the auxiliary cylinder 18. At its opposite end, the cylinder 18 is closed by a cylinder head 19 having a flange 20 thereon which lies against the end of the cylinder 18. The cylinder head 19 is apertured to receive the piston rod 12 and is also counterbored to receive packing rings 21 which are held in place within the counterbore by an end plate 22 fastened to the cylinder 18 by screws 23. The cylinder head 19 is provided with a tubular extension or sleeve 24 within which the piston rod 12 is slidably received. The outside diameter of the shank portion of the extension 24 is such as to provide a sliding fit with the inside diameter of a piston 25 working within the cylinder 18. At its distal end, the extension 24 is provided with a clamping portion 26 of reduced diameter. Longitudinally extending slots 27 are formed in the portion 26 to enable it to be compressed against the rod 12. As shown in FIG. 1, the cylinder head 11 is apertured to receive the end of the portion 26 without, however, exerting any compressive force on this portion of the sleeve.

The piston 25 is counterbored on its left hand end to receive a backup washer 30 and a stack of dished clamping discs 31. The washer 30 and discs 31 are machined on their outside diameters for a close sliding fit within the counterbore in the piston 25. The inside diameter of the washer 30 is such as to provide ample clearance to receive the clamping sleeve 26 while the inside diameters of the clamping discs 31 are finished for a close sliding fit on the outside diameter of the sleeve 26. Also, when the clamping device is released, as shown in FIG. 1, with the piston 25 in its right hand position where it bears against a shoulder 32 formed on the cylinder head 19, substantially zero clearance is provided in a longitudinal direction between the stack of discs 31 and the cylinder head 11, and also between the discs and the backup washer 30. Thus, when fluid under pressure is admitted through a port 34 provided in the wall of the cylinder 18 into the chamber formed by a chamfer 33 provided on the cylinder head 19, there will be little or no idle movement of the piston 25 before it acts to compress the discs 31 between the washer 30 and the cylinder head 11. When the discs are compressed, they contract on the sleeve 26 and squeeze it against the piston rod 12. When pressure is removed from the right-hand end of the piston 25, the discs return to their original shape and restore the piston to the position shown in FIG. 1.

As shown in FIG. 1, the right hand end of the cylinder 10 is communicatively connected with the left hand end of cylinder 18 by means of a port 35 provided in the cylinder head 11. This port communicates with the space 38 formed in the left-hand end of the cylinder 18 by a counterbore machined therein. The space 38 is in turn communicatively connected by an opening 37 with a port 36 formed in the wall of the cylinder 18. The port 36 provides means for delivering hydraulic fluid to and from the right-hand end of the hydraulic cylinder 10, and the hydraulic pressure in this end of the cylinder acts to restore the piston 25 to its released position after pressure has been removed from the right-hand end thereof.

Figure 2:
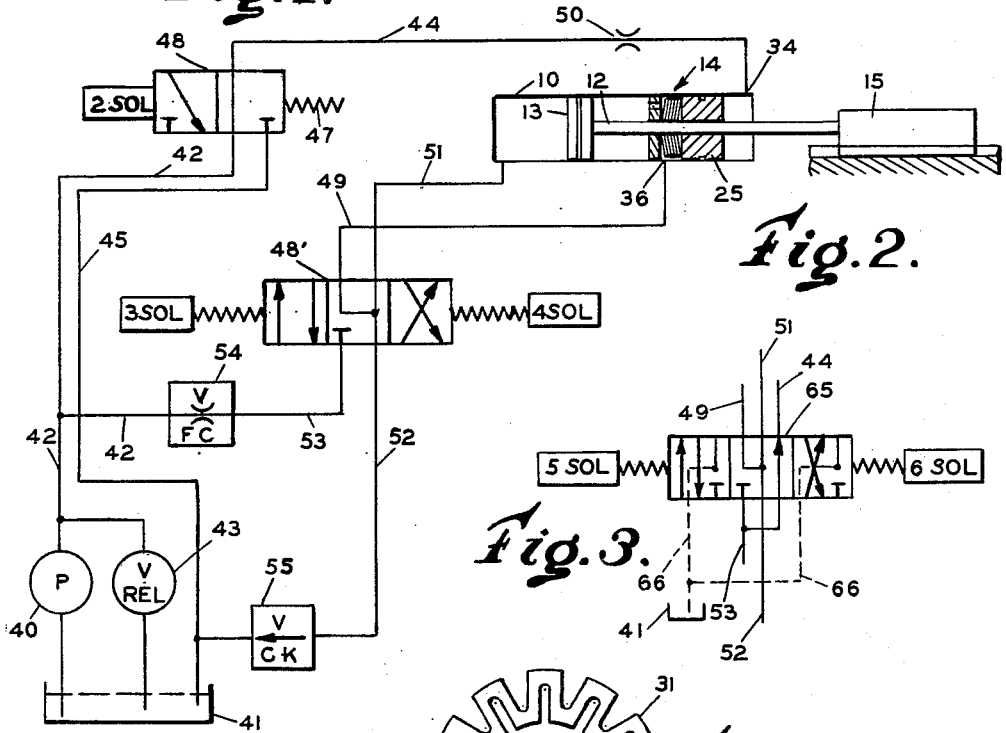
FIG. 2 is a diagrammatic view showing a hydraulic circuit for the cylinder and clamp shown in FIG. 1.

In FIG. 2 of the drawings, the hydraulic cylinder 10 and the clamping device 14 are shown connected in a hydraulic system for operating the slide 15. As therein shown, a pump 40 withdraws hydraulic fluid from a reservoir 41 and delivers it under pressure to a line 42. A relief valve 43 connected to the pressure line maintains the hydraulic pressure therein at a value corresponding to the setting of the valve. Pressure fluid in line 42 is delivered through a solenoid valve 48 to a line 44 which is connected to the port 34 of the clamping device. Thus, when the solenoid 2SOL is deenergized, the valve 48 will be in the position shown and pressure will be delivered to the port 34 thereby causing the piston 25 to compress the discs 31 and clamp the sleeve 26 onto the rod 12. However, when the solenoid 2SOL is energized, the valve will be shifted to the right against the urgency of a spring 47 and the line 44 will be connected to a return line 45 which drains into the reservoir 41. A restriction 50 is placed in the line 44 to throttle the flow of fluid into the right hand end of the auxiliary cylinder 18 when the solenoid 2SOL is deenergized. This will limit the speed of the piston 25 to the left and prevent a surge of pressure from occurring in the right-hand end of the cylinder 10 due to the sudden displacement of fluid from the left-hand end of cylinder 18.

Feeding movement of the slide 15 to the right or to the left is controlled by a reversing valve 48' which may be shifted either to the right or to the left by a pair of solenoids 3SOL and 4SOL. As indicated in FIG. 2, the port 36 of the clamping device is connected by a line 49 to a port on the valve 48'. Likewise, the left-hand end of the hydraulic cylinder 10 is connected by a line 51 with a second port on the valve 48'. In the neutral position of this valve, that is when both solenoids are deenergized, the lines 49 and 51 are both connected to a valve port to which is connected a line 52 which leads to the reservoir 41 through a check valve 55. Hence, both ends of the cylinder 10 will be connected to exhaust and the pressures on opposite sides of the piston 13 will be substantially equal to zero. However, when solenoid 3SOL is energized, the valve 48' will be shifted to the right thereby connecting the line 49 with a line 53 which is connected through a feed control valve 54 with the pressure line 42. At the same time, the line 51 will be connected to the return line 52. Accordingly, pressure will be applied to the right-hand end of the cylinder 10 while the left-hand end thereof will be connected to the reservoir. If the solenoid 2SOL of valve 48 is simultaneously energized along with solenoid 3SOL, pressure will be removed from the right-hand end of the clamping piston 25 and the clamping discs will release the piston rod 12. The pressure introduced into the right-hand end of the cylinder 10 through the port 36 (FIG. 1) will move the piston 25 to the right and thereby assist the inherent resilience of the discs in releasing the clamp.

If solenoids 4SOL and 2SOL are energized instead of solenoids 3SOL and 2SOL, fluid under pressure from the feed control valve 54 will be delivered to the line 51 and line 49 will be connected to line 52 and thence to reservoir. This will cause the slide 15 to move to the right at a rate determined by the setting of the valve 54. Due to the presence of the check valve 55 in the line 52 and the intrinsic resistance of the valve 48' and of the hydraulic lines 49 and 52, a back pressure will be built up in the right-hand end of the cylinder 10 which will apply pressure to the left-hand end of the piston 25 and assist the discs in moving it to the right when pressure is removed from line 44. The clamp will thereby be released and permit movement of the slide.

Figure 5:
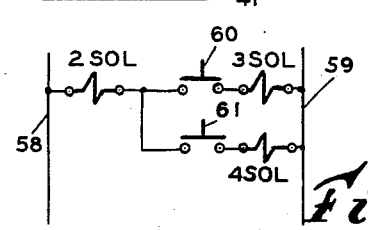
FIG. 5 is a diagrammatic view of an electrical circuit for controlling the solenoid valves shown in FIG. 2.

An electrical circuit for operating the solenoids of valves 48 and 48' is shown in FIG. 5 of the drawings. As shown in the diagram, electrical conductors 58 and 59 provide a source of energizing current for the solenoids, the potential across the conductors being sufficient to energize two of the solenoids in series when they are connected between the conductors. Thus, when pushbutton 60 is depressed, solenoids 2SOL and 3SOL will be simultaneously energized thereby releasing the brake and supplying pressure to the right-hand end of the cylinder 10 so as to move the slide to the left. In a similar fashion, when pushbutton 61 is depressed solenoids 2SOL and 4SOL will be energized thereby releasing the brake and supplying pressure to the left-hand end of the cylinder 10 so as to move the slide 15 to the right.

Figure 3:
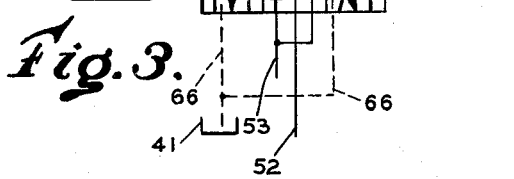
FIG. 3 is a diagrammatic view illustrating an alternative form of valve for use with the circuit shown in FIG. 2.

If desired, a single valve may be utilized in place of the pair of valves 48 and 48' shown and described in connection with FIG. 2. For this purpose, there is shown in FIG. 3 a solenoid valve 65 which may be substituted for the valves 48 and 48' in FIG. 2, the clamp line 44, cylinder lines 49 and 51, return line 52 and pressure line 53 being connected to the valve 65 as shown in the drawing. The valve is also provided with a drain line 66 for connecting the port 34 (FIG. 1) to reservoir whenever the valve is shifted from its neutral position to either of its moved positions. Thus, when solenoid 5SOL is energized and the valve shifted to the right, the pressure line 53 will be connected to the cylinder line 49 to move the slide 15 to the left. At this time, the cylinder line 51 will be connected to reservoir and the clamp line 44 will be connected to drain. When the solenoid 6SOL is energized thereby shifting the valve to the left, the pressure line 53 will be connected to the cylinder line 51 thereby shifting the slide 15 to the right. At this time the cylinder line 49 will be connected to reservoir and the clamp line 44 will be connected to drain. When the valve is in its neutral position as shown in FIG. 3, the clamp line 44 is connected to the pressure line 53 and the cylinder lines 49 and 51 are both connected to the reservoir line 52. Hence pressure will be removed from both ends of the cylinder and the clamp will be applied so as to hold the slide 15 firmly in the position to which it has been moved.

It will be appreciated from the foregoing description that since the clamping discs 31 do not bear directly upon the piston rod 12 but rather upon a clamping sleeve 26 which is anchored with respect to the clamping cylinder, and held against axial movement, it is impossible for any picking movement of the piston rod to occur due to a slight axial movement of the discs when they are compressed by the piston 25. Likewise, by utilizing a valve of the type shown in FIG. 3, or by use of the system shown in FIGS. 2 and 5, the clamp will automatically be released simultaneously with the application of pressure to the cylinder 10 to effect movement of the slide. It is also to be noted, that when pressure is applied to line 44 to set the clamp, both ends of the cylinder 10 are connected to reservoir. This, together with the restriction 50, prevents any pressure build-up from occurring in the right-hand end of the cylinder due to the displacement of fluid from the left-hand end of clamping cylinder 18 into the cylinder 10. Hence, "nudging" of the slide 15 from its present position will be prevented.

Figure 4:
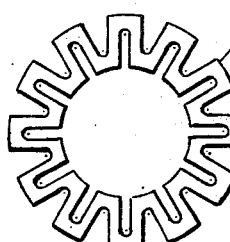
FIG. 4 is a view of one of the clamping discs used in the clamping device.

While the clamping discs 31 may be made in the form of solid dished rings or washers, it has been found advantageous to use notched discs of the type shown in FIG. 4 since such discs are more flexible and operate more efficiently as clamping members than do solid discs. The notched discs are commercially available in various sizes and designs so as to suit the particular application involved.

It is to be understood, of course, that the foregoing disclosure is intended to be illustrative only and that changes and modifications can be resorted to without departing from the spirit of the invention as defined in the appended claims.

What is claimed is:

1. A clamping device for holding a piston rod against movement relative to an operating cylinder in which it works comprising an auxiliary cylinder secured to one end of the operating cylinder with the piston rod passing through the center of the auxiliary cylinder, a piston in said auxiliary cylinder surrounding said piston rod and moveable with respect thereto, a plurality of clamping discs surrounding said rod within said auxiliary cylinder between the piston and the end of the operating cylinder, a hydraulic connection to the distal end of said auxiliary cylinder to admit pressure thereto and cause said piston to compress the discs and clamp the piston rod, and a port communicatively connecting the proximal end of said auxiliary cylinder with the adjacent end of the operating cylinder to cause the piston to be returned to its rod releasing position when pressure is admitted to the operating cylinder to effect actuation of the piston rod.

2. The clamping device of claim 1 including a clamping sleeve disposed in fixed axial relation with respect to said cylinder and interposed between said rod and said discs to receive the clamping pressure exerted by said discs and to transmit it to said rod.

3. The clamping device of claim 1 wherein said auxiliary cylinder includes a cylinder head closing the distal end of said cylinder, and a tubular extension on said head for slidably receiving said piston rod within its inside diameter and supporting said piston on its outside diameter.

4. The clamping device of claim 3 wherein the distal end of said extension is interposed between said clamping discs and said piston rod where it is provided with an axially extending slot to form a clamping sleeve around said rod.

5. A clamping device for holding a piston rod against movement relative to its operating cylinder in which it works comprising an auxiliary cylinder disposed in fixed, co-axial relation with respect to the operating cylinder, a piston in said auxiliary cylinder surrounding said piston rod and movable with respect thereto, a plurality of clamping discs surrounding said rod within said auxiliary cylinder, said discs being located between the piston and one end of said auxiliary cylinder, a clamping sleeve disposed in fixed, axial relation with respect to said auxiliary cylinder and interposed between said rod and said discs to receive the clamping pressure exerted by said discs and to transmit it to said rod, and hydraulic connections to said auxiliary cylinder for moving said piston in one direction to compress the discs between the piston and the end of the auxiliary cylinder to clamp the piston rod, and in the opposite direction to release the discs and free the piston rod.

6. A clamping device for holding a piston rod against movement relative to an operating cylinder in which it works comprising an auxiliary cylinder disposed in fixed, co-axial relation with respect to the operating cylinder, a piston in said auxiliary cylinder surrounding said piston rod and movable with respect thereto, a plurality of clamping discs surrounding said rod within said auxiliary cylinder, said discs being located between the piston and one end of said auxiliary cylinder, a control valve, a source of pressure, a reservoir, and hydraulic connections between the valve, the pressure source, the reservoir and the cylinders, said valve having a neutral position in which the distal end of said auxiliary cylinder is connected to pressure and both ends of the operating cylinder are connected to reservoir, a first displaced position in which the distal end of said auxiliary cylinder and one end of the operating cylinder are connected to reservoir while the other end of the operating cylinder is connected to pressure, and a second displaced position in which the distal end of said auxiliary cylinder and said other end of the operating cylinder are connected to reservoir while said one end of said operating cylinder is connected to pressure.

7. The clamping device of claim 6 wherein said connections include a hydraulic line connected to the distal end of the auxiliary cylinder, and a restriction connected in said line to impede the flow of fluid into said auxiliary cylinder and thereby prevent a pressure buildup from occurring in the adjacent end of the operating cylinder.

References Cited by the Examiner
UNITED STATES PATENTS

| | | | |
|---|---|---|---|
| 1,362,990 | 12/20 | Gilman | 188—67 |
| 2,404,385 | 7/46 | Fritts | 279—41 |
| 2,707,108 | 4/55 | Schottler | 188—67 X |
| 2,844,223 | 7/58 | Runner | 188—67 |
| 2,845,902 | 8/58 | Anderson | 91—45 |
| 2,889,895 | 6/59 | Snow | 91—42 X |
| 2,988,058 | 6/61 | Warnecke | 92—28 |

FOREIGN PATENTS 1,132,160  10/56  France.

FRED E. ENGELTHALER, *Primary Examiner.*

KARL J. ALBRECHT, SAMUEL LEVINE, *Examiners.*